United States Patent [19]

Burns et al.

[11] Patent Number: 5,658,125

[45] Date of Patent: Aug. 19, 1997

[54] MAGNETIC BEARINGS AS ACTUATION FOR ACTIVE COMPRESSOR STABILITY CONTROL

[75] Inventors: Donald W. Burns, Danville; John Robert Fagan, Jr., Zionsville, both of Ind.

[73] Assignee: Allison Engine Company, Inc., Indianapolis, Ind.

[21] Appl. No.: 396,014

[22] Filed: Feb. 28, 1995

[51] Int. Cl.$^6$ .............................. F01D 7/00; F01D 23/00
[52] U.S. Cl. .................... 415/1; 415/26; 415/70; 415/133
[58] Field of Search ..................... 415/1, 10, 14, 415/26, 33, 48, 70, 133; 60/726; 418/109, 29

[56] References Cited

U.S. PATENT DOCUMENTS

| | | |
|---|---|---|
| 4,057,369 | 11/1977 | Isenberg et al. . |
| 4,579,508 | 4/1986 | Tsumaki et al. . |
| 4,787,829 | 11/1988 | Miyazaki et al. . |
| 4,918,345 | 4/1990 | Vaillant de Guelis et al. . |
| 4,988,906 | 1/1991 | Littlefield . |
| 4,993,917 | 2/1991 | Kulle et al. . |
| 5,003,211 | 3/1991 | Groom . |
| 5,027,280 | 6/1991 | Ando et al. . |
| 5,028,204 | 7/1991 | Kulle et al. . |
| 5,046,151 | 9/1991 | Yamamura . |
| 5,104,284 | 4/1992 | Hustak, Jr. et al. . |
| 5,126,612 | 6/1992 | Girault . |
| 5,127,792 | 7/1992 | Katsuta et al. . |
| 5,201,642 | 4/1993 | Hinckley . |
| 5,236,318 | 8/1993 | Richardson, Jr. ............ 418/109 |
| 5,263,816 | 11/1993 | Weimer et al. ............... 415/14 |
| 5,302,874 | 4/1994 | Pinkerton . |
| 5,310,311 | 5/1994 | Andres et al. . |
| 5,312,225 | 5/1994 | Lorenzen . |
| 5,312,226 | 5/1994 | Miura et al. . |
| 5,355,042 | 10/1994 | Lewis et al. . |

FOREIGN PATENT DOCUMENTS

| | | | |
|---|---|---|---|
| 2572141 | 4/1986 | France | 415/133 |
| 58-5493 | 1/1983 | Japan | 418/109 |
| 64-41690 | 2/1989 | Japan | 418/109 |
| 389289 | 10/1973 | U.S.S.R. | 418/109 |
| 1776820 | 11/1992 | U.S.S.R. | 415/14 |
| 1 413 835 | 12/1972 | United Kingdom . | |
| 1 479 669 | 6/1974 | United Kingdom . | |
| 1 570 630 | 12/1976 | United Kingdom . | |
| 2 130 655 | 11/1983 | United Kingdom . | |

OTHER PUBLICATIONS

Copy of viewgraph presentation to NASA at Allison Engine; John Robert Fagan; Feb. 7, 1994.
Copy of viewgraph presentation to NASA at NASA–Lewis; John Robert Fagan; Feb. 10, 1994.

*Primary Examiner*—James Larson
*Attorney, Agent, or Firm*—Woodard, Emhardt, Naughton, Moriarty & McNett

[57] ABSTRACT

An integrated system for controlling the positioning of a rotating rotor within a compressor to enhance the performance of a gas turbine engine. The rotor being attached to a rotating shaft that is coupled to the compressor housing by a magnetic bearing system. The magnetic bearings support and position the rotor within the high speed tubomachine. During operation of the compressor the magnetic bearings non-axially position the rotor relative to the compressor housing to provide compressor instability control. By non-axially displacing the rotor relative to the compressor housing there is a resulting local disturbance to the fluid flow field, which in turn serves as the disturbance to alter the dynamics of the aerodynamic system and displace the compressor surge line.

53 Claims, 8 Drawing Sheets

MAGNETIC BEARINGS AS ACTUATION FOR ACTIVE COMPRESSOR STABILITY CONTROL

BACKGROUND OF THE INVENTION

The present invention relates generally to the design and construction of an integrated system for controlling rotor positioning within a compressor for improved performance and operability of a gas turbine engine. More particularly, the present invention has one application wherein radial magnetic bearings are utilized to control rotor displacement within a compressor to delay the onset of rotating stall. Although, the invention was developed for use in a gas turbine engine, certain applications may be outside of this field.

It is well known that a gas turbine engine must have a compressor component that develops some or all of the pressure rise specified by the system cycle. Modern designers of gas turbine engines have generally utilized axial flow compressors having an internal flow through an annular flow path, where the flow is influenced by both rotor and stator blade rows. The blade rows operate in an unsteady flow, where both the velocity magnitude and direction fluctuate. Further, blade rows are generally designed so as to behave as diffusers, with an increase in static pressure from the upstream to the downstream region. The individual blades are subject to lift and drag forces, they stall, and they generate boundary layers, wakes and under some circumstances shock waves.

Rotating stall and surge are two fundamental compressor instability phenomenon that set an absolute limit to the compressor operational range. With reference to FIG. 1, there is illustrated an equilibrium performance map for a compressor. At each rotational speed, the mass flow rate was varied between two limits. The upper limit on mass flow rate being close to the maximum obtainable for the compressor at that speed. The lower limit being fixed by one of these aerodynamic instabilities, surge or rotating stall. Surge is manifested by large-scale flow instability, often with pulsating reversal of flow involving the entire unit. In a gas turbine engine, compressor surge may produce catastrophically high levels of vibration and loud acoustic emissions. A surging engine operates in a low frequency limit cycle varying from the non-surging power level to a greatly reduced power level. Individual instability points at the various rotational speeds define a surge line that is universally considered as a boundary for acceptable compressor operation.

Surge occurs simultaneously throughout the entire extent of the compressor flow field, both circumferentially and axially. However, one or more blade rows may be locally stalled without the occurrence of surge. Stall is manifested by significant regions of separated flow which cause major changes in the pressure distribution around the individual compressor blade. Stall in a blade row is unique in a number of aspects, especially in the fact that zones of flow separation can propagate from blade to blade in the annulus, resulting in a phenomenon known as rotating stall. Rotating stall can also lead to high vibration levels in the compressor which ultimately result in mechanical failure. An engine in rotating stall operates at a steady, but greatly reduced level from the non-stalled power level. Compressor designers in order to obtain optimum performance often desire to operate the apparatus on the verge of stall; therefore it is important to be able to control compressor stabilities in order to delay the onset of rotating stall.

A number of passive techniques, i.e., tip casing treatment have been used to extend the operating range (displace the surge line to a lower flow level at a constant rotational speed) with varying degrees of success. Active feedback techniques have been utilized to alter the dynamics of the aerodynamic system and displace the surge line. The conventional active feedback techniques include air injection systems and oscillating guide vanes. With reference to FIG. 2, there is illustrated a conventional air injection system. Working fluid from the compressor is injected into the flow through a series of nozzles and valves located around the circumference of the compressor. The pressurized fluid is best characterized as an injected disturbance that is utilized to dampen the localized flow separations occurring around the circumference of the annular flow path, and delay or prevent the onset of rotating stall.

The air injection systems and oscillating guide vanes involve adding actuators (mechanical, aerodynamic, and aeromechanical) controllers, and sensors to the gas turbine engine. Although in many instances these technologies have demonstrated the potential for substantial benefit, they also have significant limitations. One limitation being that the required hardware adds weight and can be difficult to integrate into existing engine designs. A second limitation being that inherently these systems deliver the injected disturbance at a finite number of locations, thereby not directly altering the dynamic behavior of the fluid across the entire flow region.

Although the prior techniques utilizing air injection systems, or oscillating guide vanes are steps in the right direction for enhanced compressor stability control, the need for additional improvement still remains. The present invention satisfies this need in a novel and unobvious way.

SUMMARY OF THE INVENTION

One form of the present invention contemplates a method for enhancing the operating stability of a compressor having a rotor within a compressor housing. The method comprising: rotating the compressor rotor; and non-axially displacing the rotating compressor rotor with respect to the compressor housing, the non-axially displacing is provided to reduce circumferential pressure non-uniformities.

Another form of the present invention contemplates the combination of a gas turbine engine; and a compressor within the engine for pressurizing a fluid, comprising: a mechanical housing; a shaft rotatable within the housing; at least one airfoil connected to the shaft, the airfoil being maintained in a spaced relationship from the housing; and the shaft during the operation of the compressor being non-axially displaceable to adjust the clearance between the airfoil and the housing.

One object of the present invention is to provide an improved compressor for a gas turbine engine.

Related objects and advantages of the present invention will be apparent from the following description.

DESCRIPTION OF THE PREFERRED EMBODIMENT

Figure 1:
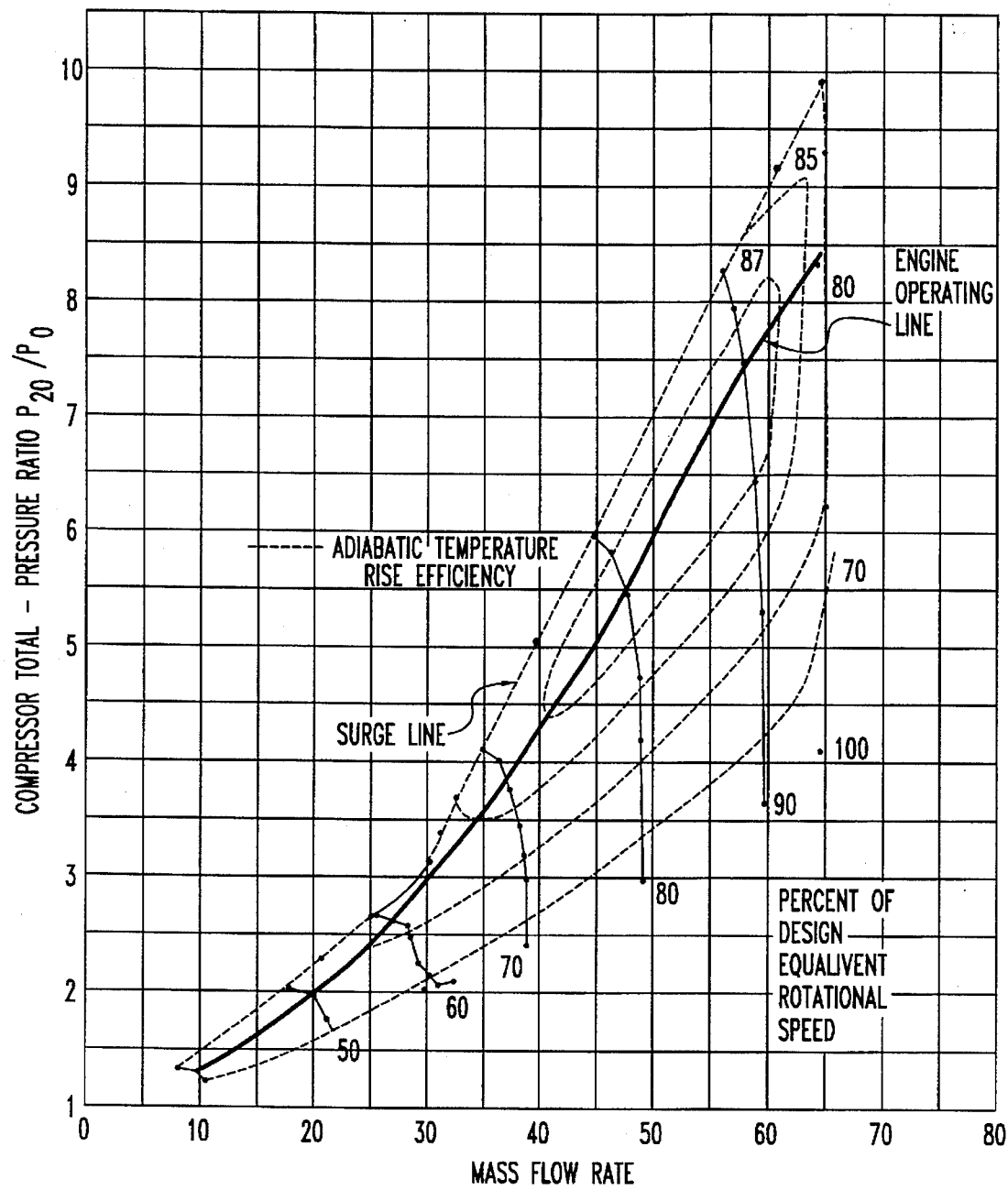
FIG. 1 is an illustrative equilibrium performance map for a compressor comprising a portion of a gas turbine engine.
Figure 2:
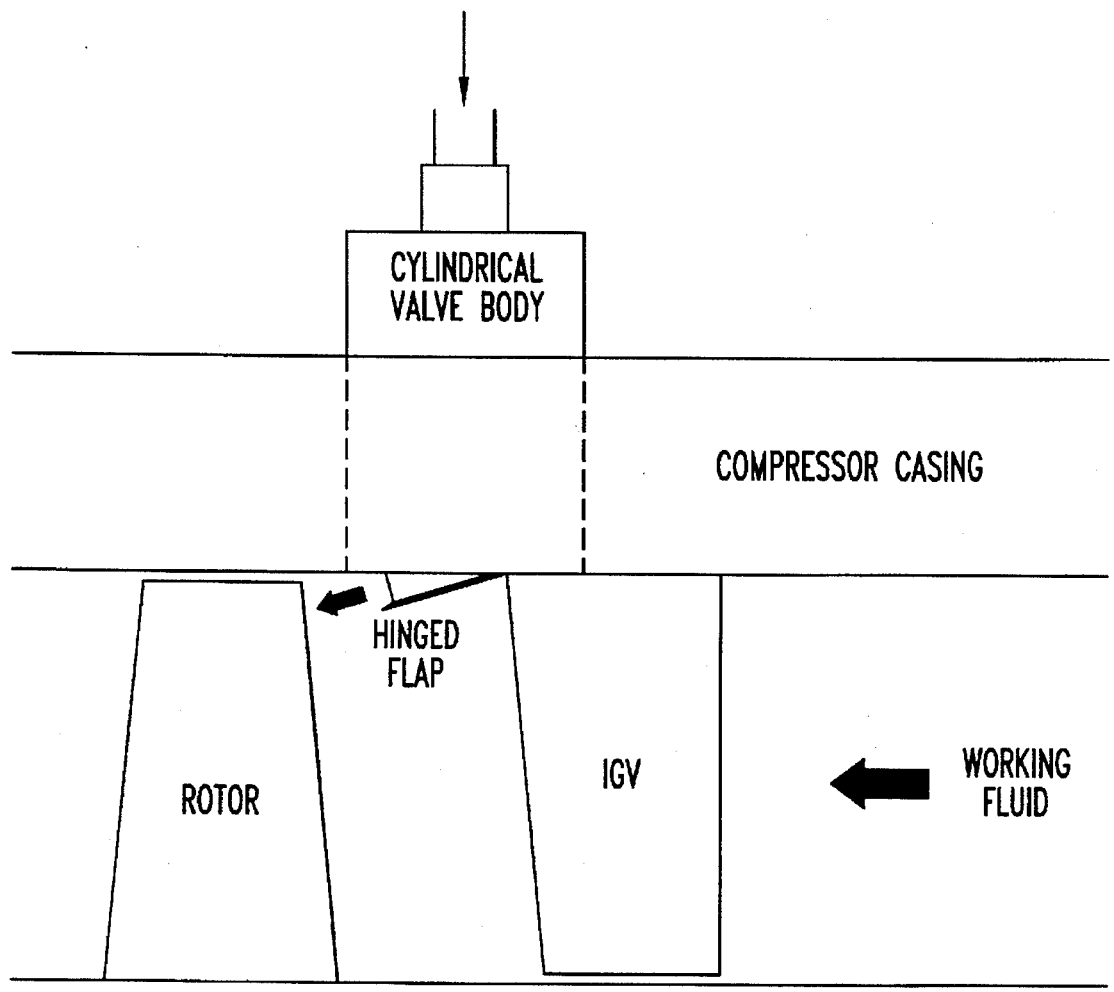
FIG. 2 is a diagrammatic view of a prior art air injection system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
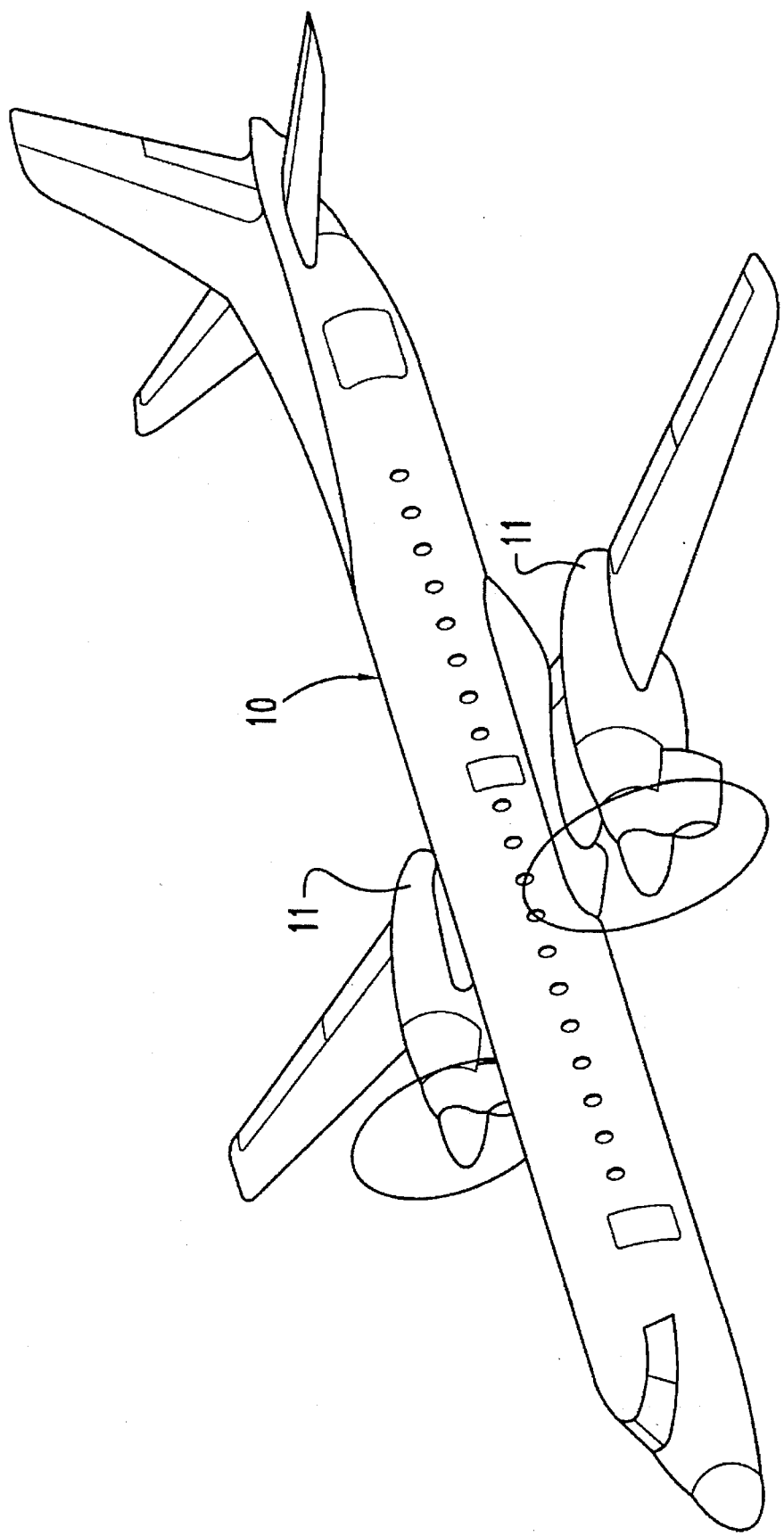
FIG. 3 is a perspective view of an aircraft having a gas turbine engine.
Figure 4:
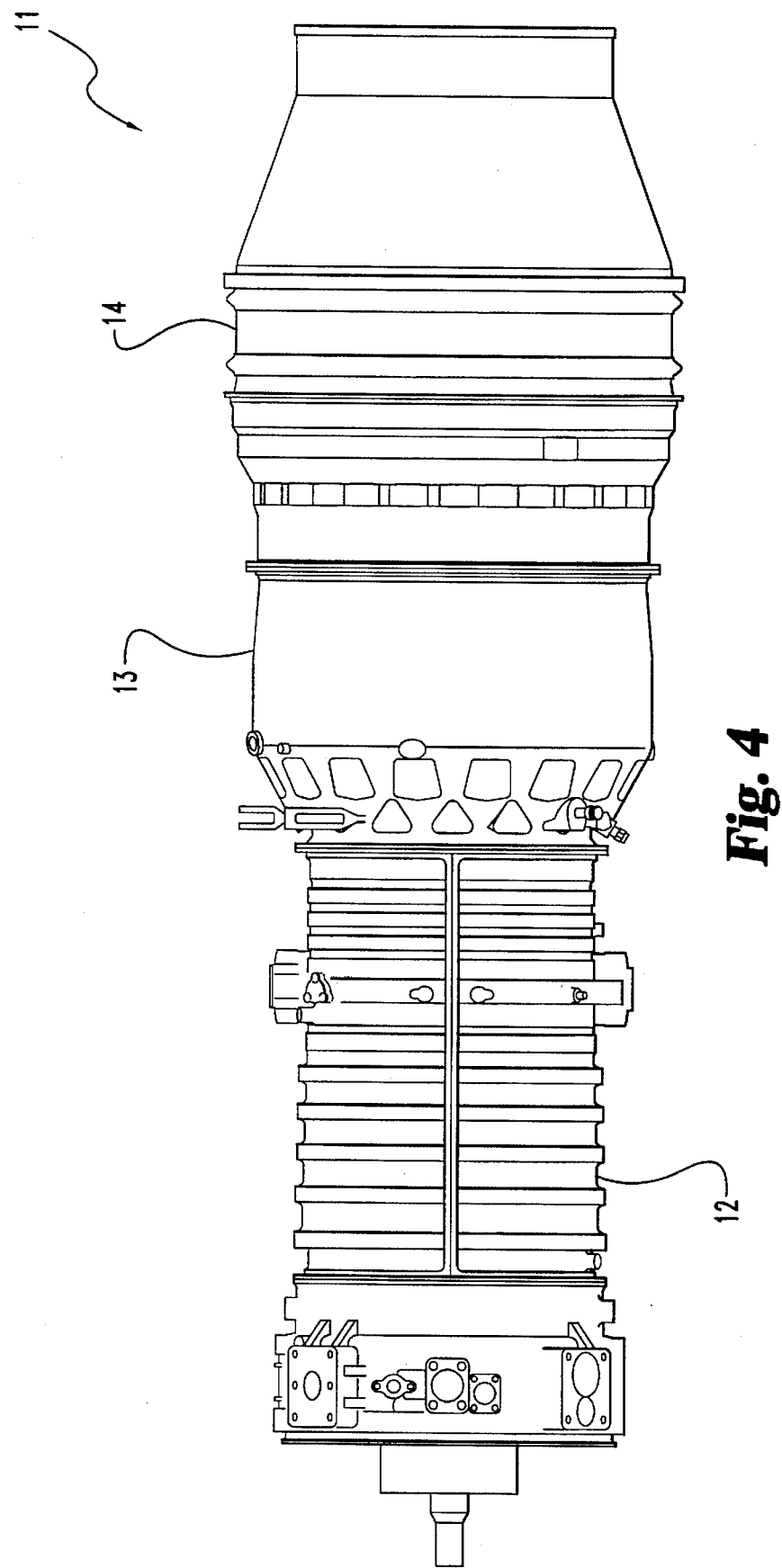
FIG. 4 is an enlarged side elevational view of the gas turbine engine of FIG. 3.

Referring to FIGS. 3 and 4, there is illustrated an aircraft 10 having an aircraft flight propulsion engine 11. It is understood that an aircraft is generic and includes helicopters, tactical fighters, trainers, missiles, and other related apparatuses. In the preferred embodiment the flight propulsion engine 11 defines a gas turbine engine integrating a compressor 12, a combustor 13, and a power turbine 14. It is important to realize that there are a multitude of ways in which the components can be linked together. Additional compressors and turbines could be added with intercoolers connecting between the compressors and reheat combustion chambers could be added between the turbines. Further, the gas turbine engine is equally suited to be used for industrial application. Historically, there has been widespread application of industrial gas turbine engines, such as pumping sets for gas and oil transmission lines, electricity generation, and naval propulsion.

Figure 5:
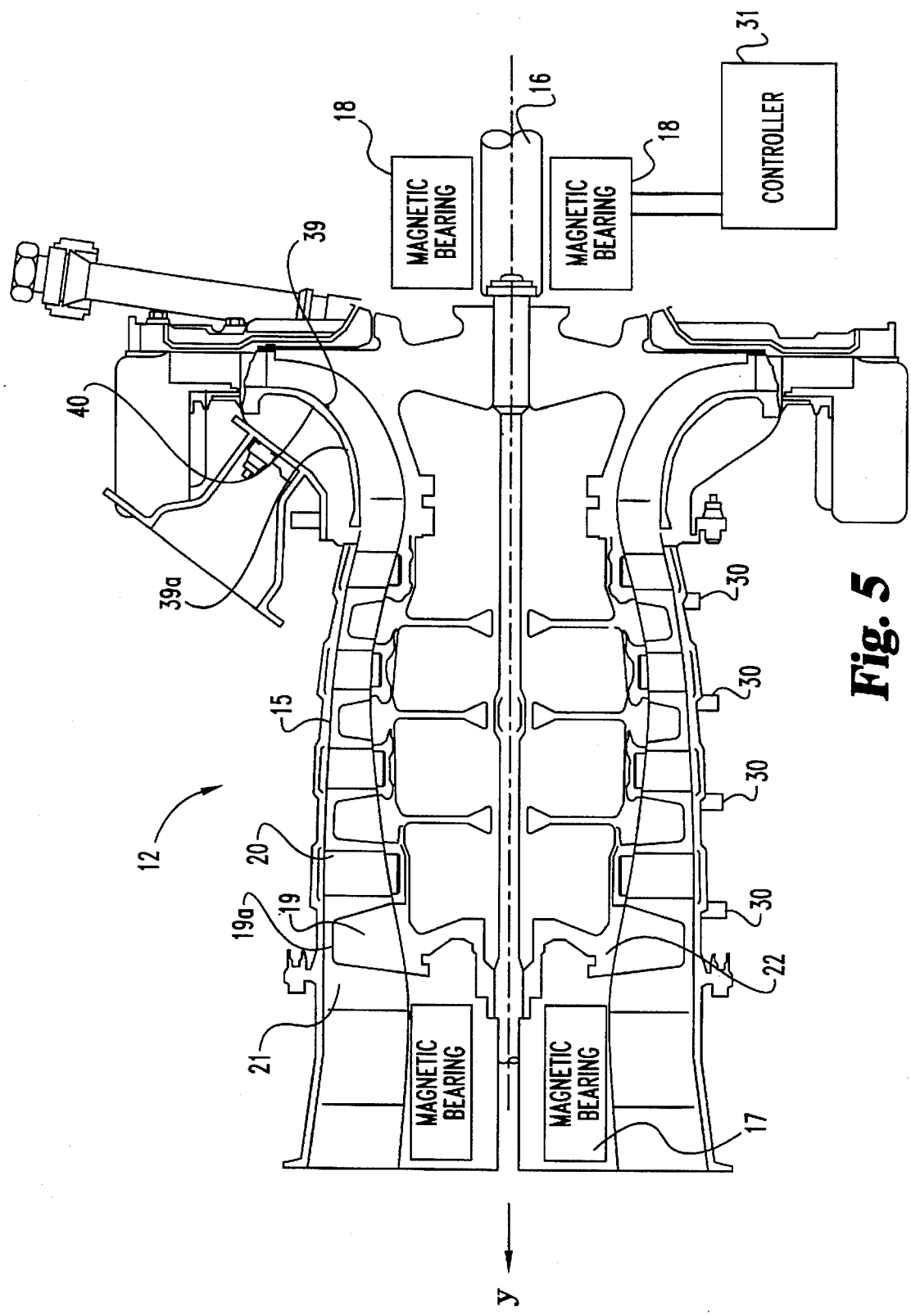
FIG. 5 is a meridional plane sectional view of the compressor comprising a portion of the FIG. 4 gas turbine engine according to one form of the present invention.

With reference to FIG. 5, there is illustrated a compressor 12 having a 5-axis magnetic bearing system. The magnetic bearing system can serve as an integrated actuator for compressor active instability control, compressor active tip clearance control, and active control of rotordynamic instabilities. Magnetic bearings are well suited for the application of these performance/operability enhancement active control techniques to gas turbine engines. It is contemplated that the actuation to control rotordynamic instabilities could also be accomplished through hydraulic or piezoelectric techniques.

The axial flow compressor 12 for pressurizing a fluid includes a mechanical housing 15 and a plurality of blade rows (rotors 22) that are fixedly mounted to a central shaft 16. It is contemplated that the present invention can be utilized in a single stage, multi stage, axial flow, centrifugal compressor, and combinations thereof. The central shaft 16 being supported by the magnetic bearing system and rotatable within the mechanical housing 15. The magnetic bearing system includes a first magnetic bearing 17 and a second magnetic bearing 18 that are integrated into the compressor 12. The magnetic bearing 17 and 18 provide the radial support and rotor positioning necessary for the high speed turbomachine 12. Further, the magnetic bearing 18 is designed and constructed to function as an axial thrust bearing.

The compressor 12 includes rows of airfoils 19, having a tip 19a, that are maintained radially spaced from the housing 15. There is a resulting clearance between the tip 19a of airfoils 19 and the mechanical housing 15. The airfoils 19 being connected to rotor 22 and rotate relative to the compressor housing 15 when the shaft 16 is rotated. The motive power to drive shaft 16 being imparted from the turbine. A plurality of corresponding stationary rows (stators) of airfoils 20 are connected to the compressor housing 15. The flow of compressible fluid through the passageway 21 within the compressor housing 15 is influenced by the rotor and stator blade rows. The blade rows are generally designed to behave as diffusers, with a corresponding increase in static pressure from the upstream region to the downstream region.

Rotordynamic instabilities are generally characterized by high vibration levels which often produce internal rubbing, abnormal wear, and in some instances complete destruction of the compressor 12. The use of conventional oil lubrication bearings impart a restriction on the design and construction of turbomachine operating shaft speeds and temperatures. Further, the utilization of magnetic bearings instead of conventional oil lubrication bearings allow the engine oil systems to be removed, resulting in significant weight reduction, reduced parasitic loses, simplification of the engine design, and improved engine reliability through the elimination of bearing wear. The use of magnetic bearings will reduce the weight of the gas turbine engine by about five percent, and benefit the environment by eliminating the handling storing and disposing of synthetic oils. Active control of the rotordynamic instabilities can be achieved through the integration into the compressor 12 of the magnetic bearing system and magnetic bearing controller.

In the preferred embodiment the compressor 12 includes both axial and centrifugal stages, and has an active tip clearance control system applicable to the centrifugal stage. The active tip clearance control system is utilized to minimize the leakage between the tips 39a of the centrifugal rotor 39 airfoils and the shroud 40. It is well known that tip clearance leakage is a major factor affecting compressor performance. In U.S. Pat. No. 5,263,816 to Weimer there is described an active tip clearance control system that is based upon electromagnetic actuator technology. In the preferred embodiment the magnetic bearing 18 has a thrust bearing component that functions as the position controller to provide the necessary axial force to displace the centrifugal rotor 39,in place of the separate actuator utilized in Weimer. A blade tip clearance sensor and a closed loop feedback circuit are integrated with the magnetic bearing controller to provide the functionality set forth in Weimer. The U.S. Pat. No. 5,263,816 to Weimer is herein incorporated by reference.

In the preferred embodiment non-axial positioning of the rotor 22 relative to the compressor housing 15 is the basis for the active stability control of the present invention. In defining the term non-axial positioning, it is understood that the non-axial movement must include a directional component other than a substantially longitudinal component (the central axis Y being a substantially longitudinal axix). In the preferred embodiment the non-axial positioning includes radial and orbital movement. In other forms of the present invention the non-axial movement includes a pitch and yaw component. The present invention contemplates that the movement can be purely non-axial or that the movement include a substantially non-axial component. The preferred embodiment utilizes the rotor positioning capability to asynchronously orbit the rotor 22 for active stability control. In the preferred embodiment the orbiting of the rotor 22 will create an asymmetric compressor flow field. Active stability control affects the dynamic behavior of the compressor and the compression system to suppress or delay the onset of rotating stall and surge.

Figure 6:
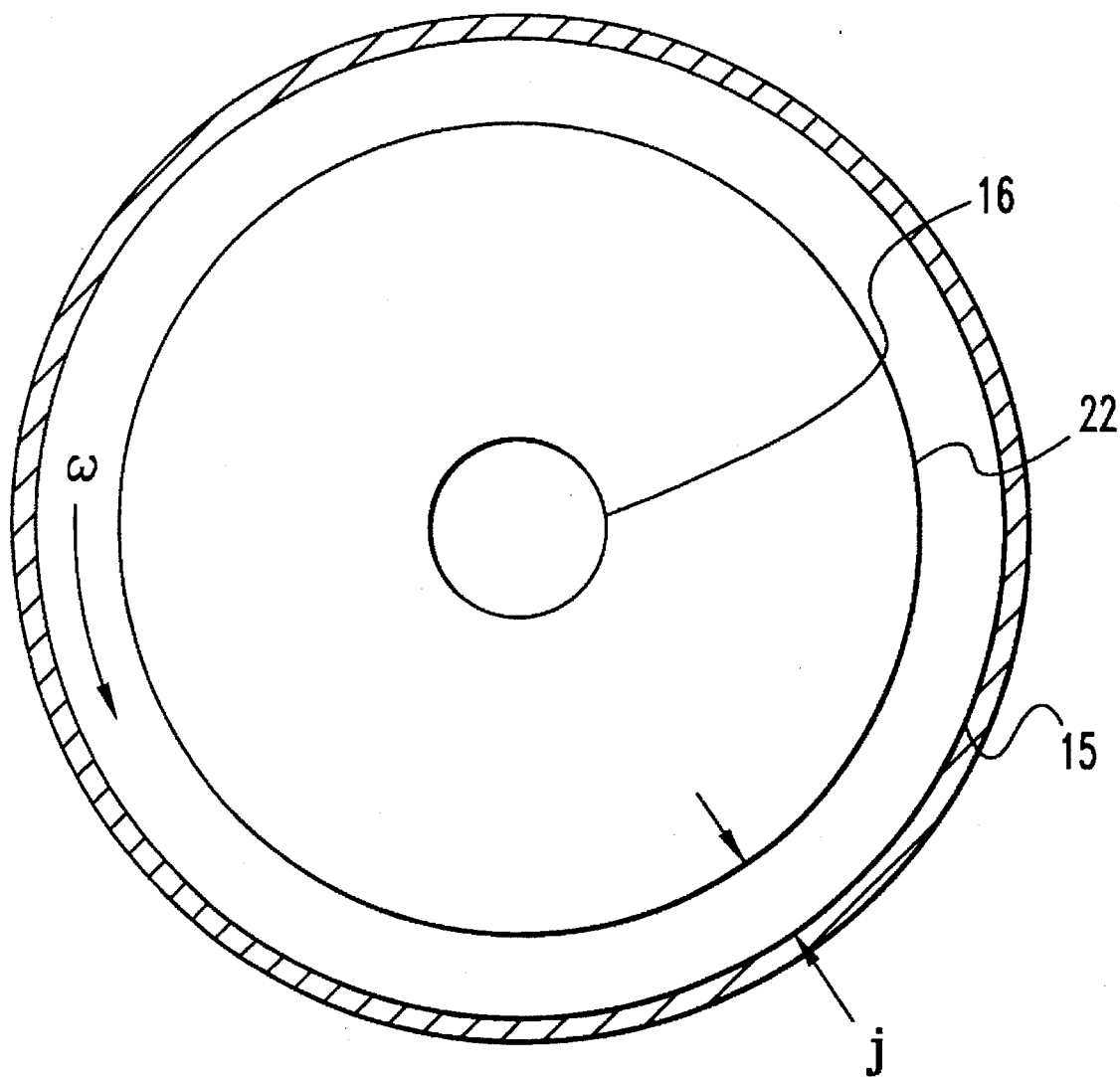
FIG. 6 is an illustrative end sectional view of the compressor of FIG. 4 having the rotor and shaft in a central longitudinal position.
Figure 7:
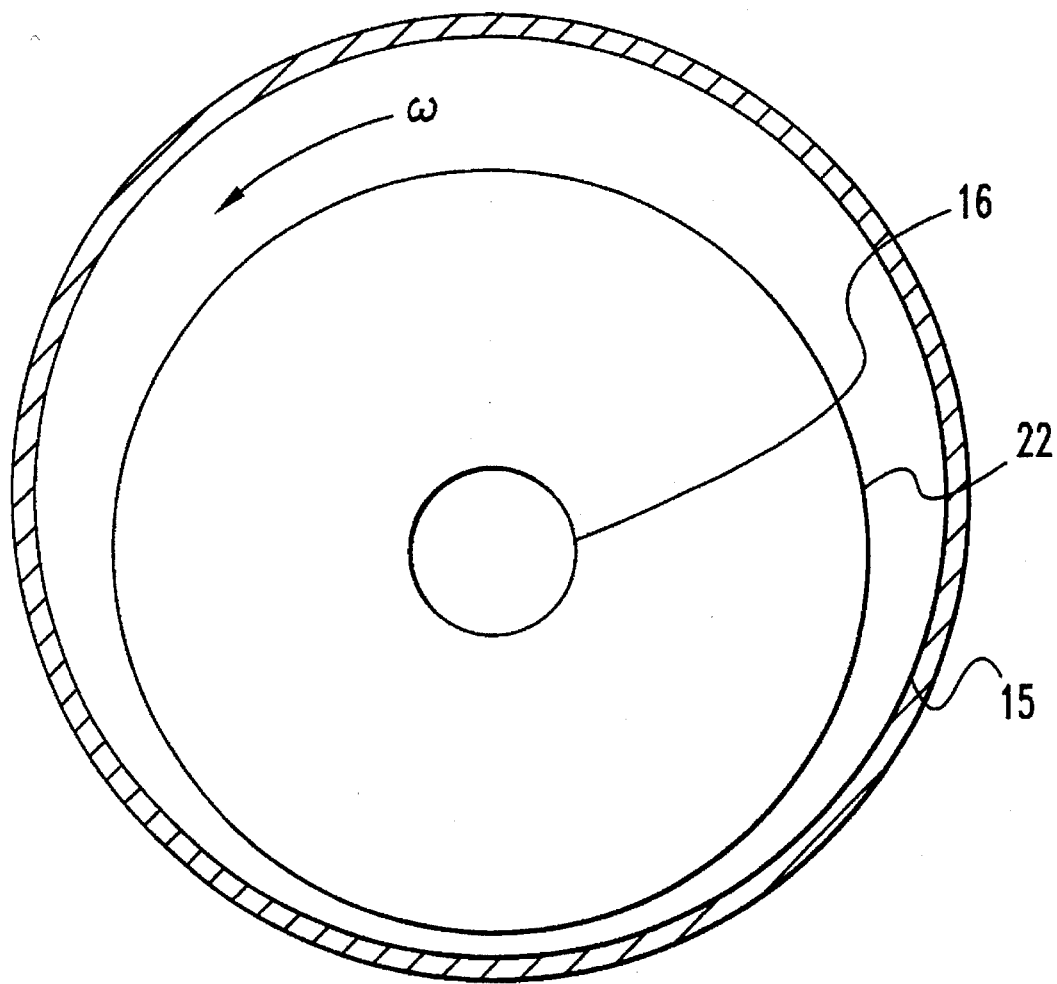
FIG. 7 is an illustrative end sectional view of the compressor of FIG. 4 having the rotor and shaft displaced from the central longitudinal position.

With reference to FIGS. 6 and 7, there is illustrated two views depicting the rotation of the rotor 22 and the shaft 16 relative to the housing 15. For clarity the rotor 22 has been illustrated as a solid disk without specifically showing the individual airfoils 19. In FIG. 6, the rotor 22 has been positioned within the housing 15 so as to center the rotor 22 with respect to the housing 15 and provide a uniform tip clearance 'j'. The movement of the rotor 22 is accomplished by the magnetic bearing 17 and 18. The magnetic bearing 17 and 18 are the actuators that couple the shaft 16 with the housing 15, and the magnetic bearings are connected to the mechanical housing 15. In centering the rotor 22 within the housing 15 the magnetic bearing 17 and 18 provide forces that result in the non-axial displacement of the shaft 16 relative to housing 15. In an alternate form of the present invention there is a mechanical bearing or limiting device that limits the travel of shaft 16 in the event that the magnet bearing system was to become deenergized, so as to prevent the rotor 22 from engaging the housing 15.

Figure 8:
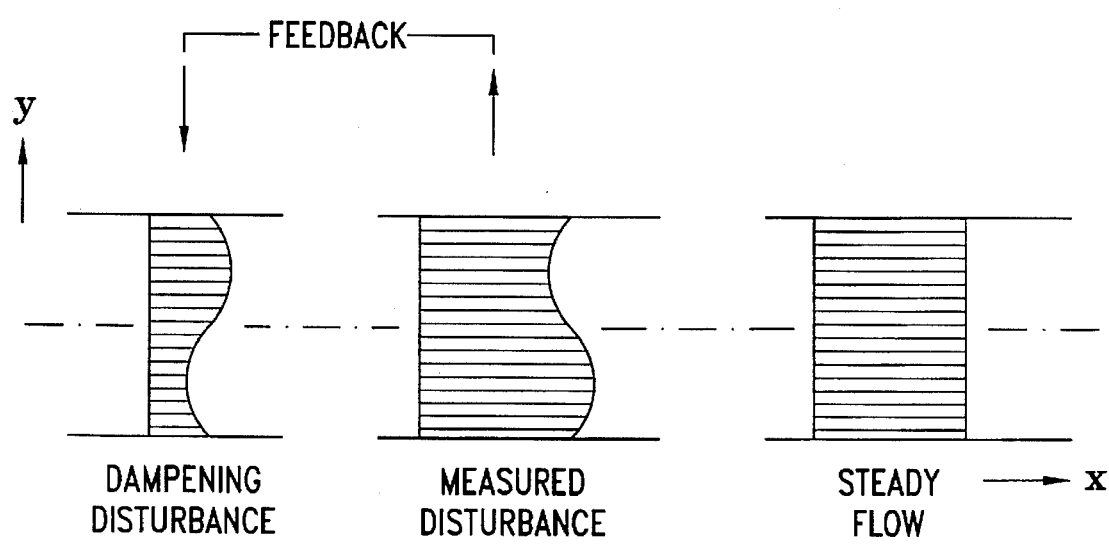
FIG. 8 is an illustrative view showing the resulting dampening of a local fluid disturbance.

The flow effectors, i.e., the aspects of the overall situation responsible for altering the circumferential and radial distribution of flow are the local variations in compressor pressure rise capability. With reference to FIG. 8, there is illustrated a diagrammatic view of the principle involved in dampening the traveling disturbance. The x axis representing the pressure ratio of the fluid flowing in pathway 21, and the y axis representing the circumferential position in the flow path. The flow effectors (Dampening Disturbance) imparted into the fluid flow by the displacement of rotor 22 function to dampen the perturbations (Measured Disturbance) in the flow and delay the onset of rotating stall. Evidence indicates that the small amplitude traveling waves (perturbations) have a causal link to the onset of rotating stall in the flow field.

Referring to FIG. 7, there is illustrated the rotor 22 being non-axially displaced relative to the compressor housing 15 so as to change the tip 19a clearance between the airfoils 19 and the housing 15. The displacement of rotor 22 can result in either uniform or non-uniform tip clearances in the present invention. The magnetic bearings 17 and 18 are the actuators that provide the motive force for varying the position of the rotor 22 with respect to housing 15. The displacement of the rotor 22 creates local differences in compressor pressure rise capability and flow, which phase and magnitude is adjusted to achieve the desired stabilization. By non-axially displacing the rotor 22 there is a resulting local disturbance to the flow field, which in turn serves as the disturbance to alter the dynamics of the aerodynamic system and displace the compressor surge line (moving the surge line to a lower flow rate at a constant rotational speed). The aerodynamic damping is initiated by the displacement of the rotor 22, and is designed to suppress the growth of traveling waves that are unstable and lead to the instability of the compressor 12. The traveling waves associated with rotating stall are typically dominated by the first circumferential harmonic.

In the preferred embodiment the control of the shaft 16 and rotor 22 positioning is driven by a closed loop feedback system. The closed loop feedback system obtains input data from a plurality of sensors 30 located along the fluid flow path 21. The sensors 30 measure fluid parameters, such as the localized velocity or pressure of the fluid. The data points from the sensors 30 are inputs into an algorithm which controls the magnetic bearing system that determines the relative movement of the rotor 22. It is understood that in the preferred embodiment that the shaft 16 and the plurality of blade rows (rotors 22) are mechanically affixed. A high speed digital controller 31 with a communication channel having sufficient bandwith to pass the necessary data to control the rotor stability in a high speed gas turbine engine is connected to the magnetic bearing system. The high speed digital controller 31 contains the algorithms necessary to accomplish the active control techniques of the present invention. The preferred embodiment utilizes electronic feedback, however other forms of the present invention accomplish the feedback through a tailored structure that interacts with the aerodynamic system.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for enhancing the operating stability of a compressor having a rotor within a compressor housing, comprising:
   rotating the compressor rotor; and
   non-axially displacing the rotating compressor rotor with respect to the compressor housing, said non-axially displacing is provided to reduce circumferential pressure non-uniformities.

2. The method of claim 1, which further includes sensing fluid parameters within said compressor housing, and said non-axially displacing being in response to said sensing.

3. The method of claim 2, wherein said non-axially displacing imparts a dampening disturbance into a circumferential flow.

4. The method of claim 1, wherein at least one magnetic bearing being associated with said non-axially displacing.

5. The method of claim 4, which further includes supporting the rotor.

6. The method of claim 1, wherein said non-axially displacing imparts flow effectors into a flow field to dampen perturbations in the flow field and delay the onset of rotating stall.

7. The method of claim 2, which further includes communicating said sensed fluid parameters into a control system.

8. The method of claim 3, which further includes axially displacing the rotor to adjust the clearance between a tip of the rotor and the compressor housing.

9. The method of claim 8, wherein said axial displacement is associated with at least one magnetic bearing.

10. In combination:
    a gas turbine engine; and
    a compressor within said engine for pressurizing a fluid, comprising:
       a mechanical housing;
       a shaft rotatable within said housing;
       at least one rotor connected to said shaft, said at least one rotor being maintained in a radially spaced relationship from said housing; and
       said shaft during the operation of said compressor being non-axially displaceable to adjust the radial spacing between said at least one rotor and said housing.

11. The combination of claim 10, which further includes at least one magnetic bearing for supporting and linking said shaft to said housing.

12. The combination of claim 11, wherein said at least one magnetic bearing for non-axially displacing said shaft to adjust the radial spacing between said at least one rotor and said housing.

13. The combination of claim 12, wherein said rotor includes a plurality of airfoils.

14. The combination of claim 13, which further includes a plurality of sensors to indicate fluid parameters within said mechanical housing.

15. The combination of claim 14, wherein said sensors are located along a fluid flow path.

16. The combination of claim 15, which further includes a closed loop feedback control system to control the positioning of said rotor and shaft.

17. The combination of claim 12, wherein said at least one magnetic bearing is attached to said mechanical housing.

18. The combination of claim 17, which further includes an axial thrust actuator for axially displacing said rotor relative to said mechanical housing.

19. The combination of claim 18, wherein said axial thrust actuator is a magnetic bearing.

20. The combination of claim 19, wherein said axial thrust actuator for adjusting the clearance between said rotor and said housing to minimize the fluid leakage therebetween.

21. In combination:
   an aircraft;
   a gas turbine engine connected with said aircraft; and
   a compressor within said engine for pressurizing a fluid, comprising:
      a mechanical housing;
      a shaft rotatable within said housing;
      at least one airfoil connected to said shaft, said airfoil being maintained in a spaced relationship from said housing; and
      said shaft during the operation of said compressor being non-axially displaceable to adjust the clearance between said airfoil and said housing.

22. The combination of claim 21 which further includes at least one magnetic bearing for supporting and linking said shaft to said housing.

23. The combination of claim 22, wherein said at least one magnetic bearing for non-axially displacing said shaft to adjust the radial spacing between said at least one airfoil and said housing.

24. The combination of claim 23, which further includes a plurality of sensors to indicate fluid parameters within said mechanical housing.

25. The combination of claim 24, wherein said sensors are located along a fluid flow path.

26. The combination of claim 25, which further includes a closed loop feedback system to control the positioning of said at least one airfoil and shaft.

27. The combination of claim 21, which further includes an axial thrust actuator for axially displacing said at least one airfoil relative to said mechanical housing.

28. The combination of claim 27, wherein said axial thrust actuator is a magnetic bearing.

29. The combination of claim 28, wherein said axial thrust actuator for adjusting the clearance between said at least one airfoil and said housing to minimize the fluid leakage therebetween.

30. A compressor for pressurizing a fluid, comprising:
   a mechanical housing;
   a shaft rotatable within said housing;
   at least one sensor for measuring fluid parameters within said housing;
   an actuator connecting said shaft with said mechanical housing, said actuator responsive to said at least one sensor for displacing said shaft non-axially with respect to said housing.

31. The compressor of claim 30, wherein said actuator is at least one magnetic bearing.

32. The compressor claim 31, wherein said at least one magnetic bearing for supporting and positioning said shaft relative to said housing.

33. The compressor of claim 32, which further includes a plurality of airfoils connected to said shaft, said airfoils being spaced from said housing.

34. The compressor of claim 33, wherein said non-axially displacing said shaft adjusts the radial spacing between said airfoils and said housing.

35. The compressor of claim 31, which further includes a plurality of sensors for measuring fluid parameters within said housing.

36. The compressor of claim 35, which further includes a controller for receiving fluid parameters from said plurality of sensors.

37. The compressor of claim 36, wherein said controller is a part of a closed loop feedback system for controlling the position of said shaft.

38. The compressor of claim 33, which further includes an axial thrust actuator.

39. The compressor of claim 38, wherein said axial thrust actuator is a magnetic bearing.

40. The compressor of claim 39, wherein said axial thrust actuator for adjusting the clearance between said plurality of airfoils and said housing in order to minimize fluid leakage therebetween.

41. A compressor for pressurizing a fluid, comprising:
   a mechanical housing;
   a shaft rotatable within said housing;
   a rotor connected to said shaft, said rotor being maintained spaced from said housing; and
   said shaft and said rotor being orbited within said housing to change the radial spacing between said rotor and said housing.

42. The compressor of claim 41, which further includes at least one magnetic bearing for supporting and linking said shaft and rotor to said housing.

43. The compressor of claim 42, wherein said rotor being orbited within said housing imparts flow effectors into the flow field to dampen the perturbations in the flow and delay the onset of rotary stall.

44. The compressor claim 43, which further includes a plurality of sensors for sensing fluid parameters within said mechanical housing.

45. The combination of claim 44, which further includes an axial thrust actuator for axially displacing said rotor relative to said mechanical housing.

46. The combination of claim 45, wherein said axial thrust actuator is a magnetic bearing.

47. A compressor for pressurizing a fluid, comprising:
   a mechanical housing
   a shaft rotatably mounted within said housing;
   a rotor connected to said shaft, said rotor having a tip spaced radially from said housing;
   at least one sensor for measuring fluid parameters within said housing; and
   said shaft being non-axially displaceable during the operation of said compressor, wherein the non-axial displacement of said shaft being responsive to said sensor and the non-axial displacement of said shaft causing the non-axial displacement of said rotor with respect to said housing.

48. The compressor of claim 47, wherein said rotor includes a plurality of circumferentially spaced airfoils.

49. The compressor of claim 47, which further includes at least one magnetic bearing for coupling said shaft with said housing.

50. The compressor of claim 49, which further includes a controller to control and position said rotor and shaft relative to said mechanical housing.

51. The combination of claim 50, which further includes an axial thrust actuator for axially displacing said rotor relative to said mechanical housing.

52. The combination of claim 51, wherein said axial thrust actuator is a magnetic bearing.

53. The combination of claim 52, wherein said axial thrust actuator for adjusting the clearance between said rotor and said housing to minimize the fluid leakage therebetween.

* * * * *